J. L. WOODBRIDGE.
MEANS FOR RECTIFYING SINGLE PHASE CURRENTS.
APPLICATION FILED MAY 4, 1908.
941,599.
Patented Nov. 30, 1909.
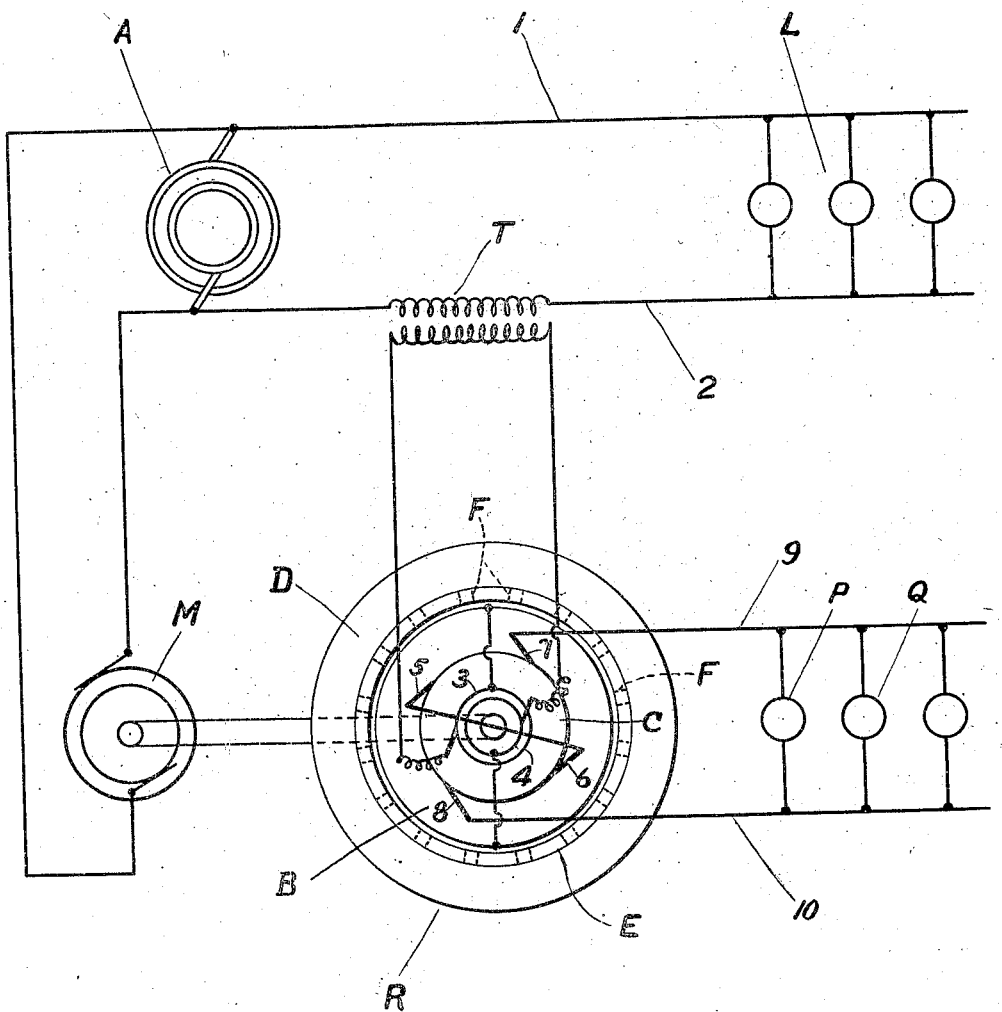
WITNESSES:
INVENTOR
Joseph L. Woodbridge
BY
Augustus B. Stoughton
ATTORNEY.

UNITED STATES PATENT OFFICE.

JOSEPH LESTER WOODBRIDGE, OF PHILADELPHIA, PENNSYLVANIA.

MEANS FOR RECTIFYING SINGLE-PHASE CURRENTS.

941,599.  Specification of Letters Patent.  Patented Nov. 30, 1909.

Application filed May 4, 1908. Serial No. 430,839.

*To all whom it may concern:*

Be it known that I, JOSEPH L. WOODBRIDGE, a citizen of the United States, and a resident of Philadelphia, in the county of Philadelphia and State of Pennsylvania, have invented certain new and useful Means for Rectifying Single-Phase Currents, of which the following is a specification.

My invention applies to apparatus designed for rectifying alternating currents and is particularly adapted for rectifying single phase currents. It may also be used for rectifying poly-phase currents where the currents on the different phases are unequal.

In my Patent No. 880,705, issued to me under date of March 3rd, 1908, I have described apparatus which may be used for rectifying polyphase alternating currents. If such apparatus is used for rectifying single phase currents a uni-directional pulsating current will be produced in the direct current circuit. In order to utilize this apparatus for producing a continuous instead of a pulsating direct current proportional to a single phase alternating current, I have introduced an improvement consisting principally of a squirrel cage structure surrounding the armature of the rectifier.

Referring to the accompanying drawing A, is a source of single phase alternating current feeding the circuit 1, 2, to which translating devices L are connected.

R, is a rectifier designed in accordance with my invention to supply direct current to the circuit 9—10 proportional to the alternating current in conductor 2.

The rectifier R consists of an armature B revolving in a stationary ring D of magnetic material such as iron. The armature is provided with a winding which is connected at two opposite points to the collector rings 3 and 4, and is also connected in the usual manner to the commutator C upon which bear two pair of brushes 5—6 and 7—8. A synchronous motor M driven by current from the conductors 1—2, rotates the armature in synchronism with the electro-motive-force across said conductors.

A current transformer T is shown, having its primary winding connected in series with conductor 2, while its secondary winding is connected by suitable brushes to the collector rings 3 and 4. By this means alternating current is transmitted through the armature winding producing a single phase alternating field in the armature and in the ring D. This alternating field may be resolved into two component rotating fields revolving in opposite directions with respect to the armature. By reason of the synchronous rotation of the armature, one of these fields will be held stationary in space, while the other will revolve at double synchronous speed.

Surrounding the armature is shown a squirrel cage consisting of a series of bars F F embedded in the inner face of the iron ring D, extending parallel to the axis of the armature and connected to each other at their opposite ends by two conducting rings of which one is shown at E. This squirrel cage is made up of conductors of low resistance in the usual manner. The effect of that component of the alternating field which is revolved at twice the speed of synchronism is to produce currents in this squirrel cage, which will have the effect of neutralizing this field except for a very small residuum necessary to produce the electro-motive-force required to maintain the currents in the squirrel cage. This residuum, being very small, may be neglected. There will remain only that component of the field, which by reason of the rotation of the armature is held stationary in space. Assume that this field component is located in the line joining the brushes 7—8. The effect of this field will be to produce an electro-motive-force between the brushes 5 and 6. These latter brushes are short-circuited so that a very small electro-motive-force will cause a considerable flow of current between them. This latter current produces a second field displaced 90° from the first and this latter field will produce an electro-motive-force between the brushes 7 and 8. This latter electro-motive-force will cause a flow of current in the circuit 9—10 through any translating devices which may be connected in that circuit such as P and Q. This latter current will flow through the armature winding between the brushes 7—8 in the direction to neutralize the stationary field produced by the alternating current and will neutralize it except for a small residuum necessary to produce the electro-motive-force and flow of current between the brushes 5—6. Any increase in alternating current in conductor 2 will be accompanied by a corresponding increase in direct current in the circuit 9—10; for if this latter increase should not occur, the stationary field produced by the alternating current would no longer be neutralized but would produce a considerable voltage across the brushes 5 and 6, and this latter would cause a very heavy flow of current between those brushes followed by a very great increase in the electro-motive-force between the brushes 7—8, which will immediately produce the necessary increase in current in the conductors 9—10 corresponding with the increase in current in conductor 2.

It will be understood that the rectified current may be utilized in any suitable and convenient manner and in any kind of direct current apparatus, or for any purpose where a direct current proportional to an alternating current is desired. It will also be understood that modifications may be made in the details of my invention without affecting the spirit thereof, and I therefore do not limit myself further than the prior state of the art may require, but Having described my invention what I claim and desire to secure by Letters Patent is—

1. In combination, an armature with appropriate windings and commutator, a squirrel cage structure of conducting material surrounding the armature, means for transmitting alternating current through the armature windings, two sets of electrically displaced brushes bearing upon the commutator, whereof each set is interconnected by an independent electrical circuit, and means for producing relative rotation of armature and brushes in synchronism with the alternating current.

2. In combination, an alternating current circuit, an armature with its appropriate windings and commutating provisions, means for producing in the armature a single phase alternating field responsive to the current in the circuit, means for neutralizing one of the two revolving components of said field, means including a set of electrically interconnected brushes for producing a secondary field responsive to the unneutralized component of the first, means including a second set of electrically interconnected brushes for permitting a flow of direct current responsive to the secondary field, and means for producing relative rotation of armature and brushes in synchronism with the alternating current in the circuit.

3. In combination, an alternating current circuit, an armature with its appropriate windings and commutator, a stationary field structure and a stationary conducting circuit of low resistance surrounding the armature, means for supplying alternating current to the armature winding from the circuit, a synchronous motor mechanically connected to the armature and electrically connected to the circuit, two sets of electrically displaced brushes bearing on the commutator, a conducting circuit connecting the brushes of one set, and means for utilizing the current from the other set.

In testimony whereof I have hereunto signed my name.

JOSEPH LESTER WOODBRIDGE.

Witnesses:
W. J. JACKSON,
FRANK E. FRENCH.